United States Patent [19]

Baur

[11] Patent Number: 5,158,345
[45] Date of Patent: Oct. 27, 1992

[54] STORAGE UNITS FOR COMPUTER TAPE CASSETTES

[75] Inventor: Rolf Baur, Heubach-Lautern, Fed. Rep. of Germany

[73] Assignee: GRAU GmbH & Co., Fed. Rep. of Germany

[21] Appl. No.: 869,118

[22] Filed: Apr. 15, 1992

Related U.S. Application Data

[63] Continuation of Ser. No. 551,637, Jul. 12, 1990, abandoned, which is a continuation of Ser. No. 306,181, Feb. 6, 1989, abandoned.

[30] Foreign Application Priority Data

Sep. 8, 1988 [DE] Fed. Rep. of Germany ....... 3830486
Oct. 10, 1988 [DE] Fed. Rep. of Germany ....... 3834389

[51] Int. Cl.⁵ .................................................. A47F 1/04
[52] U.S. Cl. ................................... 312/9.46; 312/9.12; 312/97.1; 312/319.6
[58] Field of Search ............... 312/9, 11, 13, 193, 312/97.1, 12, 16, 319, 15; 206/387

[56] References Cited

U.S. PATENT DOCUMENTS

| | | | |
|---|---|---|---|
| 3,338,421 | 8/1967 | Lyman | 312/13 |
| 4,239,109 | 12/1980 | Nielson et al. | 312/13 |
| 4,609,232 | 9/1986 | Florence | 312/11 |
| 4,668,027 | 5/1987 | King et al. | 312/13 |
| 4,844,564 | 7/1989 | Price et al. | 312/11 |

FOREIGN PATENT DOCUMENTS 1172840 8/1985 U.S.S.R. .................... 312/97.1

*Primary Examiner*—Gerald A. Anderson
*Attorney, Agent, or Firm*—Nixon & Vanderhye

[57] ABSTRACT

Computer tape cassette storage units store a number of computer tape cassette during periods of nonuse and are particularly adapted for use in an automated tape cassette archiving and retrieval system. The storage units include at least one shelf unit having a substantially horizontally disposed shelf for supporting a row of computer tape cassettes on edge. Structures are provided so as to minimize (if not eliminate) the possibility that the tape cassettes will become dislodged from the shelf units in the event of mechanical shocks and/or vibrations (e.g., which may occur in an automated system due to a robotic manipulator coming into physical contact with the storage unit). Such structure may take the form of a forward lip against which a portion of the tape cassettes abuts, and/or structures which shift the centers of gravity of the tape cassettes rearwardly toward the rear wall of the shelf units upon which they are supported.

15 Claims, 4 Drawing Sheets

STORAGE UNITS FOR COMPUTER TAPE CASSETTES

This is a continuation of application Ser. No. 07/551,637, filed Jul. 12, 1990, now abandoned, which is a continuation of application Ser. No. 07/306,181, filed Feb. 6, 1989, now abandoned.

RELATED APPLICATIONS

This application is related to commonly owned, and copending U.S. Applications Ser. No. 07/182,593 filed Apr. 18, 1988, in the name of Rolf Baur and entitled "Robot Transport System Adapted to Interact with Separate Equipment at Spaced Locations, and Ser. No. 07/306,182, abandon, filed even date herewith in the name of Rolf Baur and entitled "Automated Archiving And Retrieval System For Computer Tape Cassettes", the entire content of each being expressly incorporated hereinto by reference.

FIELD OF INVENTION

This invention relates to the field of computer tape cassette archiving systems. More specifically, the present invention relates to tape storage units which store computer tape cassettes during periods of non-use and which are especially adapted for use in automated tape cassette archiving and retrieval systems (e.g., of the type disclosed in my above-identified related U.S. Patent Applications).

BACKGROUND AND SUMMARY OF THE INVENTION

Today's large scale computer rooms typically employ human technicians which manually load magnetic data storage media (e.g. magnetic tapes) onto computer drives. With the recent advent of computer tape cassettes (i.e., as represented by the 3480 compatible system), the space requirement for physically cataloging and storing the magnetic media has decreased (due to the decreased size of these tape cassettes as compared to the more conventional magnetic tape spools).

In my above-identified copending U.S. patent applications, there are disclosed novel robot transport systems having particular utility in the automated archiving and retrieval of computer data tape cassettes. In particular, the robot transport systems disclosed in those copending U.S. patent applications allow computer tape cassettes to be moved between a tape storage facility (where individual tape cassettes are archived) and a tape drive section (composed of individual tape drive units).

According to one aspect of the present invention, rotatable tape cassette storage carousels are provided which are especially adapted for use in the automated tape cassette archiving and retrieval systems disclosed in my above-identified copending U.S. patent applications. In general, the storage carousels of this invention include a number of vertically stacked shelf units each having a generally horizontally oriented shelf for supporting a row of tape cassettes on edge. The stacked shelf units are positioned a predetermined radial dimension from a central support shaft which is rotatably coupled to a motor-driven pedestal. Position sensors are provided in operative association with the carousel so that its particular rotational position may be sensed by appropriate supervisory controls associated with the automated tape cassette archiving and retrieval systems (e.g., to ensure that the correct shelf unit holding a preselected tape cassette is rotated into confronting relationship to a robotic manipulator associated with the robot transport system.

As may be appreciated, it is difficult (if not impossible) to eliminate entirely the possibility that a robotic manipulator will come into physical contact with the tape cassette storage unit during insertion/removal of a tape cassette into/from its particular location on the self. That is, while the controls may be designed so as to accurately guide the robotic manipulator relative to the tape storage units, it is usually inevitable that some misalignment between the tape storage unit and the robotic manipulator will occur. Thus, when attempting to insert/remove a tape cassette into/from the tape storage unit, the robotic manipulator may come into physical contact with the storage unit thereby causing mechanical shock and/or vibrations to occur. These mechanical shocks and/or vibrations may, moreover, be of such a magnitude that some of the tape cassettes may be dislodged physically from their shelf and thus tumble to the computer room floor. Needless to say, such an occurrence is extremely disruptive to an automated system since human intervention is then needed to re-shelve the dislodged computer tape cassettes. Therefore, any commercially acceptable tape cassette archiving and retrieval system must be capable of tolerating equipment "crashes" as may occur between the robotic manipulator and the tape cassette storage units.

Thus, according to a further aspect of this invention, the tape storage units are provided with means which serve to maintain the tape cassettes in their respective locations and thus minimize (if not eliminate) the possibility that the tape cassettes will become dislodged from their respective shelves in response to mechanical shocks and/or vibrations. The self units may therefore simply be provided with a raised forward lip extending the entire transverse length of the shelf to thereby serve as a stop member against which the tape cassettes abut. Alternatively (or conjunctively) means may be provided so as to, in effect, rearwardly displace the tape cassettes' centers of gravity. In this manner, the tape cassettes are encouraged to remain on the self (i.e., due to their centers of gravity being displaced away from the open front of the shelf) when the tape storage unit experiences mechanical shocks and/or vibrations.

Other aspects and advantages of this invention will become more clear after careful consideration is given to the detailed description of the preferred exemplary embodiment thereof which follows.

BRIEF DESCRIPTION OF THE ACCOMPANYING DRAWINGS

Reference will hereinafter be made to the accompanying schematic drawings wherein like reference numerals throughout the various FIGURES denote like structural elements, and wherein.

DETAILED DESCRIPTION OF THE PREFERRED EXEMPLARY EMBODIMENTS

Figure 1:
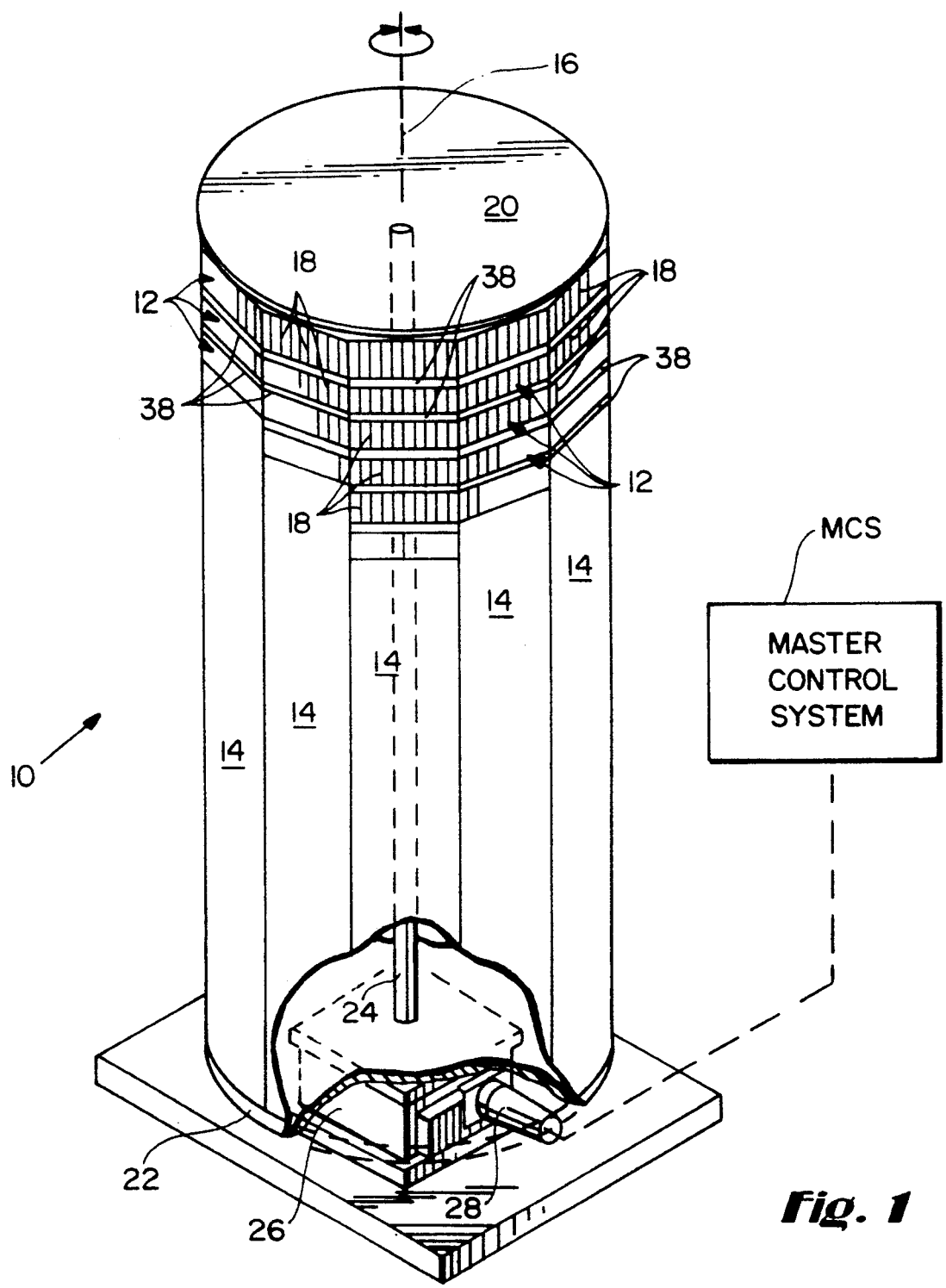
FIG. 1 is a perspective elevational view of a rotatable tape cassette storage carousel according to the present invention.

A tape storage carousel 10 according to the present invention is shown in schematic perspective elevation in accompanying FIG. 1. As is seen the carousel 10 is generally cylindrical in configuration an includes a number of vertically stacked, open-front shelf units 12. The stacks of shelf units 12 thereby collectively establish respective columns 14 positioned substantially equal radial distances from the rotation axis 16 about which the entire carousel 10 rotates. The individual shelf units thereby serve to support a number of computer tape cassettes on their respective side edges (a representative number of tape cassettes is identified in FIG. 1 by reference numeral 18).

The columns 14 of shelf units 12 are positionally maintained by means of upper and lower mounting plates 20, 22, respectively. A central shaft 24 is vertically disposed within the open interior space of the carousel and is connected rigidly at its upper end to the upper mounting collar 20, and is journally coupled at its lower end to a drive pedestal 26. The mounting plates 20, 22 together with the central shaft 24 thereby provide a frame onto which the shelf units may be mounted. Drive pedestal 26 houses suitable gears (or like power transmission structure) and thereby serves to operatively couple the output of reversible motor 28 to the shaft 24 so as to enable the shaft 24 (and hence the entire carousel 10) to rotate about axis 16.

In use, a computer room operator will select a particular tape cassette to be inserted into a particular tape drive unit with which the carousel is operatively associated (i.e., by inputting the identity of the tape cassette and the particular tape drive unit into a suitable master control system). The master control system MCS will have the physical location of the tape cassette stored in memory (e.g., in an electronic "look-up" table) and will thus issue an output signal to the motor 28 to thereby rotate the carousel 10 in a predetermined direction about axis 16. The carousel is thereby rotated until that column 14 of shelf units 12 which contains the selected tape cassette is in confronting relationship to a robotic manipulator (not shown), at which time rotation of the carousel 10 is stopped. At that time, the master control system MCS may then issue the appropriate commands to the robotic manipulator (not shown) so that the selected tape cassette is removed from its location in the carousel 10, transported to a selected tape drive unit, and inserted thereinto for use. Of course, re-shelving of the tape cassette after removal from the tape drive unit would proceed in an opposite manner.

As may be appreciated, it is necessary for the master control system MCS to "know" the angular location of the columns 14 of shelf units 12 relative to the robotic manipulator—i.e., so that the carousel is rotated the correct angular distance to orient the proper column 14 of shelf units 12 in confronting relationship to the robotic manipulator. According to the present invention, the master control system MCS may be provided with such positional location by means of paired, vertically separated position indicators 30 and position sensors 32, only a representative few of which are shown in FIG. 2.

Figure 2:
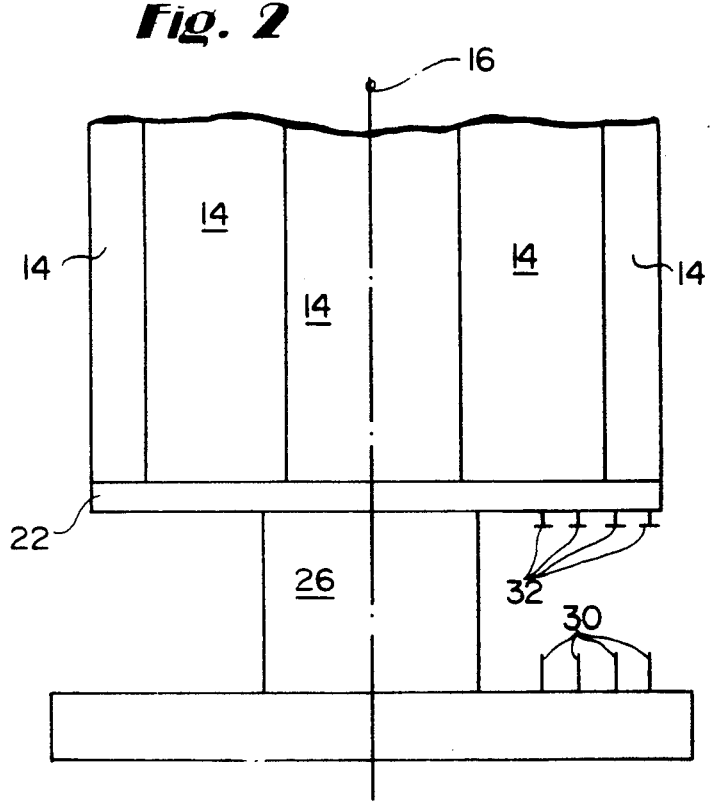
FIG. 2 is a partial side elevational view of the bottom section of the storage carousel depicted in FIG. 1.

As is schematically represented in FIG. 2, pairs of indicators and sensors 30, 32, respectively, are disposed about the general periphery of the carousel 10 at its bottom end such that the indicators 30 and sensors 32 project toward one another. That is, each of the indicators 30 are in fixed-position relative to one another and relative to the rotatable shelf units 12, while each of the sensors 32 are in fixed position relative to one another but are rotatable with the carousel. Hence, relative rotational movement is effected as between the indicators and sensors 30, 32, respectively. Moreover, each indicator 30 and sensor 32 is spaced-apart from angularly adjacent ones of the indicators 30 and sensors 32, respectively, by a preselected angular dimension about the periphery of the carousel 10, while the pairs of indicators 30 and sensors 32 are vertically separated (i.e., so as to allow for relative rotational motion to occur therebetween, it being understood that the vertical spacing between the indicators 30 and sensors 32 is shown in a greatly enlarged manner in FIG. 2 for clarity of presentation).

The indicators 30 are preferably formed of a suitable magnetic material whereas the sensors 32 are preferably a switch which closes in response to coming into close proximity to the magnetic field of the indicators. In use, therefore, the sensors 32 will each "close" when the carousel 10 is rotated such that the sensors 32 are in vertical alignment with respective ones of the indicators 30. The closure of the sensors 32 may thus be used to indicate the precise angular position of the carousel 10. In this regard, a number of position-determining algorithms may be envisioned. For example, if the sensors 32 and indicators 30 are provided in equal numbers about the entire periphery of the carousel, then with each closure of the sensors 32, the master control system MCS will be informed (via signals from each of the sensors 32) that the carousel has been rotated through an angle increment $\alpha$ corresponding to the angular dimension between each indicator and sensor.

Thus, if the carousel 10 is rotated from a "zeroed" position known to the master control system, then the number of signals issued by the sensors 32 may be added or subtracted (depending upon the rotational direction of the carousel 10) by the master control system MCS so that the precise positions of the columns 14 of shelf units 12 may be established during such rotational movement of the carousel 10. Thus, for each column 14 of shelf units 12, the master control system MCS will be able to calculate the number of signals needed to be received when the carousel is rotated in a predetermined direction so as to place a selected one of the columns 14 in confronting relationship to the robotic manipulator.

Figure 3:
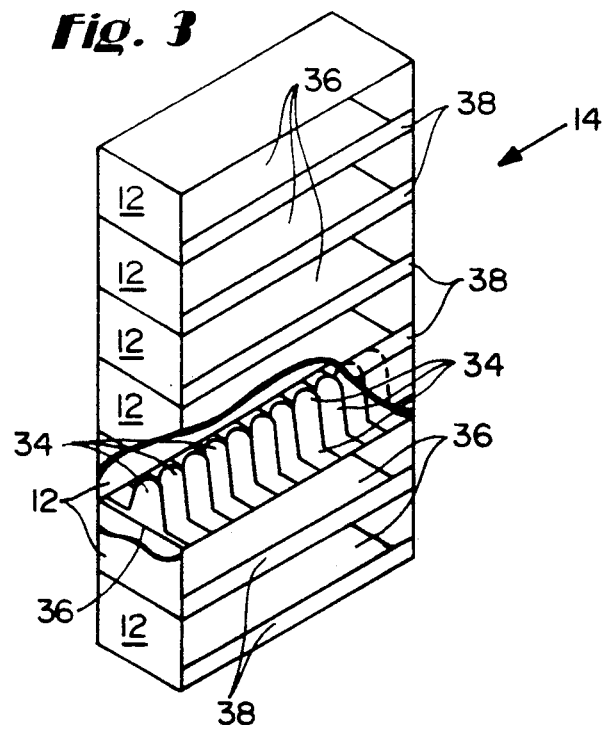
FIG. 3 is a perspective elevational view of a representative shelf unit employed in the storage carousel of FIG. 1.

A representative column 14 comprised of a number of vertically stacked shelf units 12 which may be utilized in the carousel 10 according to the present invention is shown in schematic perspective view in accompanying FIG. 3. One of the shelf units 12 is shown in accompanying FIG. 3 as being broken away so as to allow the dividers 34 to be more easily viewed, it being understood that the other shelf units 12 preferably also are provided with such dividers 34. As is seen the dividers 34 vertically project from the horizontal shelf 36 (forming the bottom wall of each shelf unit 12) and are horizontally separated one from the other by a predetermined dimension. The dividers thereby define individual spaces sized and configured so as to accept therewithin a computer tape cassette on its side edge. Usually, the individual shelf units will have a depth (i.e., a dimension as measured from front to rear) of about 135 millimeters.

It will be observed that the shelf units 12 each have an open front so as to enable the robotic manipulator to grasp individual ones of the tape cassettes supported upon the selves 36. However, in order to minimize the possibility that tape cassettes will become dislodged from the shelf units 12 in response to mechanical shocks and/or vibrations (which may occur should the robotic manipulator contact the shelf units 12, for example), a forward lip 38 projects upwardly from the front edge of each of the shelves 36. Thus, a lower portion of the cassettes 18 will abut against this lip 38 (see FIG. 1) and thereby be retained on their respective shelves 36. It should be noted here that the lip 38 only needs to project upwardly by a relatively small dimension (e.g., about 5 millimeters) in order to provide the function discussed above.

Figure 4:
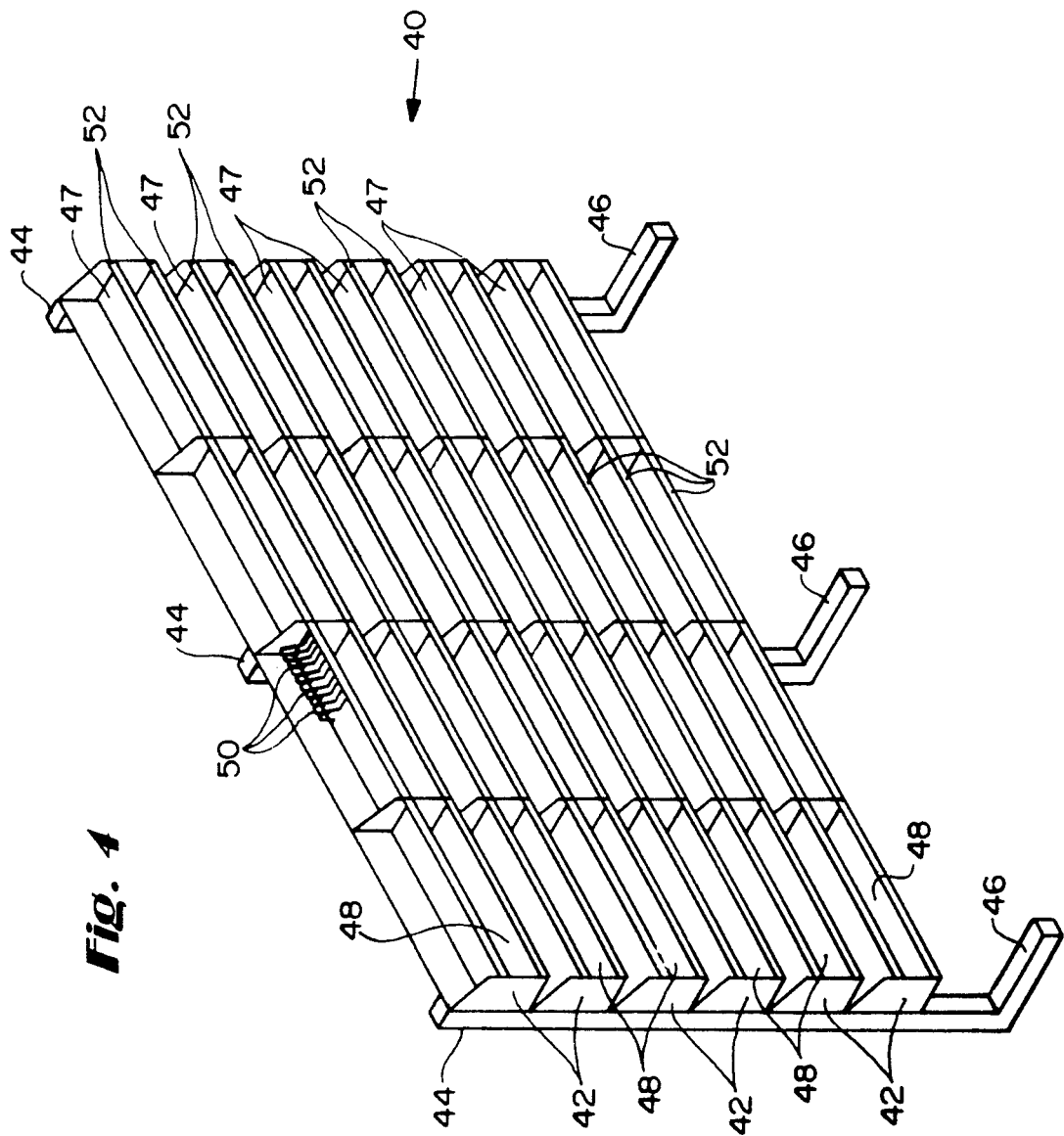
FIG. 4 is a perspective elevational view of a stationary tape cassette storage unit according to the present invention.

Accompanying FIG. 4 schematically depicts another embodiment of a tape cassette storage unit 40 according to the present invention. The storage unit 40 shown in FIG. 4 is preferably stationary (i.e., not rotatable) and may be used in those computer rooms where the increased storage capacity of the carousels 10 discussed above is not needed. The storage unit 40 generally includes a number of vertically stacked shelf units 42 fixed to upright supports 44. The lower ends 46 of supports 44 may thus be secured rigidly to the computer room floor in which the unit 40 is used.

Each of the shelf units 42 preferably includes a pair of vertically separated, horizontally parallel upper and lower shelves 47, 48. Like the carousel 10 discussed above with reference to FIGS. 1–3, the shelves 47, 48 of storage unit 40 shown in FIG. 4 will include dividers 50 (a representative few of which are only shown in FIG. 4 for clarity of presentation) so as to define spaces to accept individual computer tape cassettes on edge. Moreover, a forward lip 52 extending the horizontal dimension of each of the shelves 47, 48 is preferably provided so as to assist in retaining the tape cassettes in place during any mechanical shocks and/or vibrations which might occur during operation of the robotic manipulator.

Figure 6:
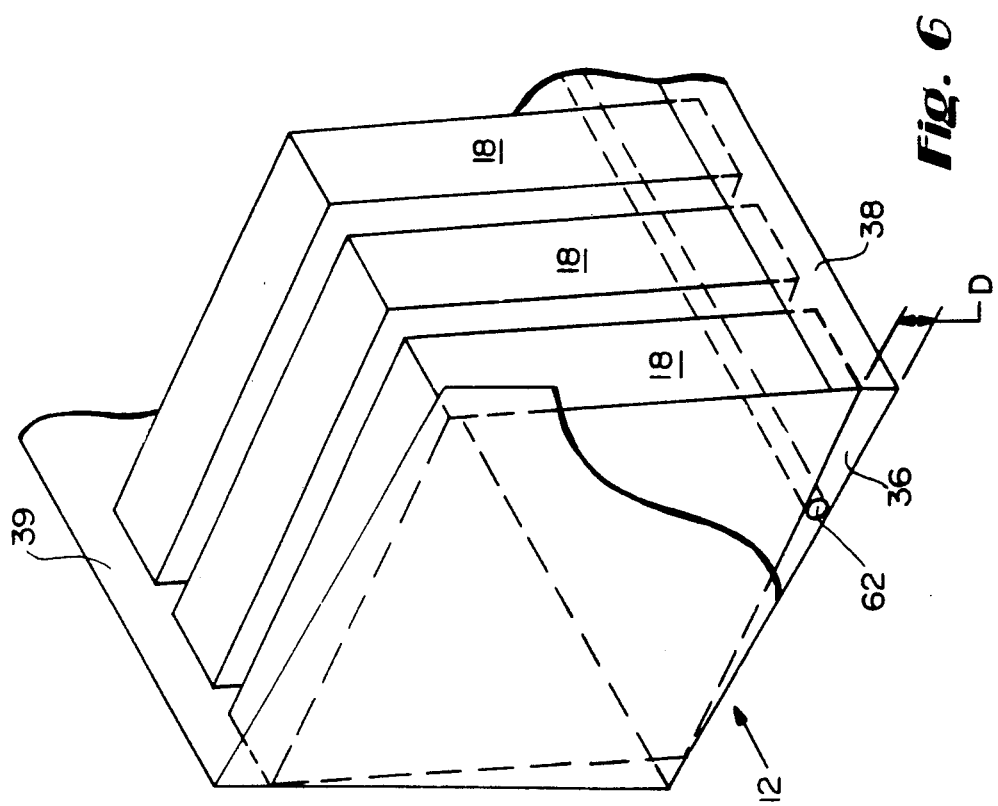
FIG. 6 is a perspective view of another possible embodiment of a tape cassette storage shelf according to the present invention.
Figure 5:
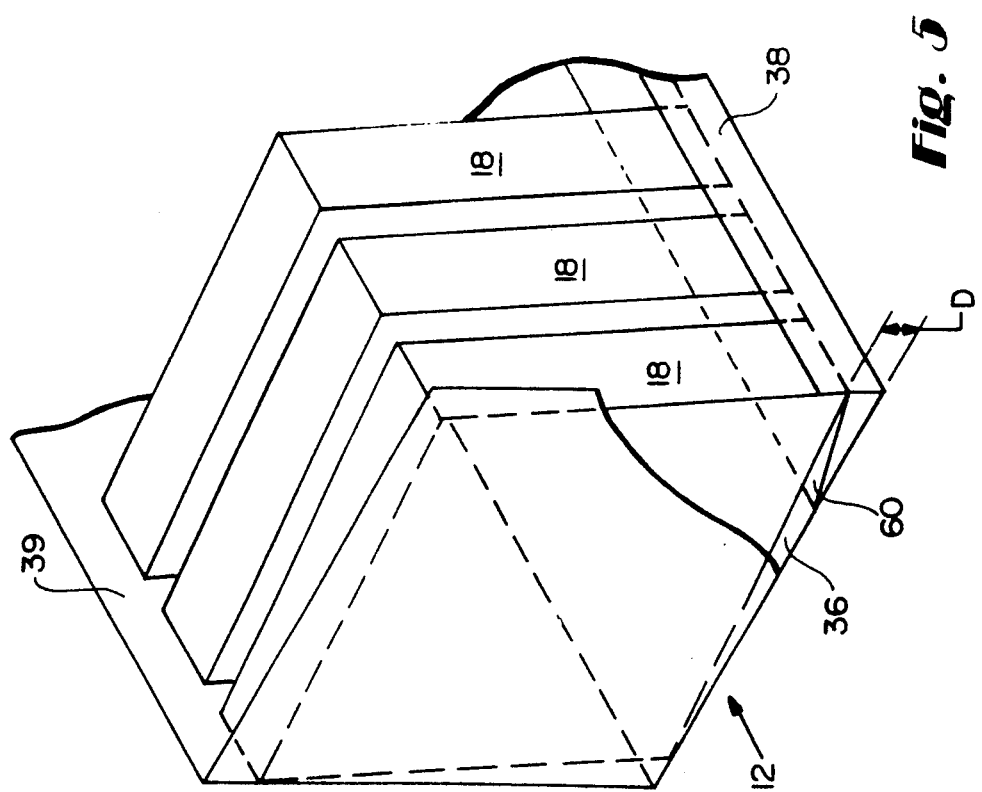
FIG. 5 is a perspective view of one possible embodiment of a tape cassette storage shelf according to the present invention.

Additional stabilization of the computer tape cassettes 18 so as to minimize the possibility that one or more of them will become dislodged from the shelf units 12 of carousel 10 (or shelf units 42 of storage unit 40) may be provided as is shown in accompanying FIGS. 5 and 6. It will be understood that, although the reference numerals employed in FIGS. 5 and 6 correspond to the rotatable tape storage carousel 10 shown in FIGS. 1–3, the structures to be discussed could also be suitably employed in the stationary tape storage unit 40 shown in FIG. 4.

As is seen in FIG. 5, the individual tape cassettes 18 are positioned on their side edges upon the shelf 36 of shelf unit 12. A lower portion of the forward ends of each tape cassette 18 thus abuts against the forward lip 38 upwardly projecting from the shelf 36. Additional stabilization of the tape cassettes 18 (i.e., so positionally retained in the shelf unit 12 even when mechanical shocks and/or vibrations are experienced) is provided by means of an upwardly inclined plate 60 upon which a forward portion of the cassette rests. The upward inclination of the plate 60 thereby raises the forward end of the tape cassettes 18 by a dimension "D" above the plane of the shelf 36. As a result, the centers of gravity of the tape cassettes are shifted rearwardly towards the rear wall 39 of the shelf unit 12. Thus, in the event that mechanical shocks and/or vibrations are experienced, the tendency of the individual cassettes 18 will be to move rearwardly towards the shelf unit's rear wall 39, instead of possibly moving forwardly towards the open front end of the shelf unit 12. AS such, the cassettes 18 are reliably maintained in position upon the shelf 36 of shelf unit 12.

FIG. 6 shows one possible alternative to the inclined plate 60 discussed above in relation to FIG. 5. Thus, in order to rearwardly shift the centers of gravity of the tape cassettes 18, the embodiment of the shelf unit 12 shown in FIG. 6 employs a rod 62 extending the entire horizontal dimension of the shelf 36. Like the plate 60, the rod 62 shown in FIG. 6 serves to vertically displace a forward end of the tape cassettes 18 by a dimension "D", and thus shift the centers of gravity of the cassettes 18 towards the rear wall 39.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A storage unit for storing a number of data storage cassettes and for presenting individual ones of the data storage cassettes at an access position where the cassettes may be grasped and removed from the storage unit, said storage unit comprising:

a plurality of storage columns, each column comprising a plurality of vertically stacked shelf units each including generally horizontally disposed cassette compartments for storing a number of data storage cassettes on edge in a row such that in each column said data storage cassettes are arranged in a vertical storage plane, each of said shelf units including;

(i) a horizontal bottom wall supporting each of said data storage cassettes on one side edge, (ii) an open front so as to enable individual ones of said storage cassettes to be grasped and removed from the shelf units, and (iii) a forward lip projecting upwardly from a front edge of said bottom wall for retaining said tape cassettes and so substantially preventing said tape cassettes from becoming dislodged from said shelf units by shock, wherein said storage unit further comprises, a frame defining a central axis for mounting said plurality of columns a radial dimension from said central axis so that said plurality of columns are rotatable about said central axis;

a motor drive unit operatively coupled to said frame for rotating said columns about said central axis so that a selected one of said columns and individual ones of said data storage cassettes stored therein may be moved into said access position; and an automated master control unit electrically interconnected to said motor drive unit, said master control unit issuing a control signal to said motor drive unit which responsively causes said motor drive unit to effect preselected angular movement of said columns about said central axis so as to thereby controllably move said selected one of said plurality of columns into said access position to thereby present said individual ones of data storage cassettes in said selected one of said columns at said access position, whereby said individual ones of said data storage cassettes may be grasped and removed from said selected one of said columns.

2. A storage unit as in claim 1, wherein said radial dimension from said central axis is identical for all said columns.

3. A storage unit as in claim 1, wherein said plurality of columns forms a generally cylindrical body.

4. A storage unit as in claim 1, wherein said columns are exchangeably held in said frame.

5. A storage unit as in claim 1, wherein said frame includes a central shaft which defines said central axis about which said plurality of columns are rotatable.

6. A storage unit as in claim 5, wherein said motor drive unit includes a reversible motor having an output coupled operatively to said central shaft.

7. A storage unit as in claim 6, wherein said reversible motor is arranged below said plurality of columns.

8. A storage unit as in claim 1, further comprising position sensing system for sensing relative positions of said columns when said storage unit is rotated.

9. A storage unit as in claim 8, wherein said sensing system is arranged below said columns.

10. A storage unit as in claim 8, wherein said position sensing system generates position signals, and wherein said master control unit receives said generated position signals from said position sensing system and in response thereto determines the angular location of said columns.

11. A storage unit for storing a number of data storage cassettes and for presenting individual ones of the data storage cassettes at an access position where the cassettes may be grasped and removed from the storage unit, said storage unit comprising:

a plurality of storage columns, each column comprising a plurality of vertically stacked shelf units each including generally horizontally disposed cassette compartments for storing a number of data storage cassettes on edge in a row such that in each column said data storage cassettes are arranged in a vertical storage plane, each of said shelf units including;

(i) a horizontal bottom wall supporting each of said data storage cassettes on one side edge, (ii) an open front so as to enable individual ones of said storage cassettes to be grasped and removed from the shelf units, and (iii) a forward lip projecting upwardly from a front edge of said bottom wall for retaining said tape cassettes and so substantially preventing said tape cassettes from becoming dislodged from said shelf units by shock, wherein said storage unit further comprises, a frame defining a central axis for mounting said plurality of columns a radial dimension from said central axis so that said plurality of columns are rotatable about said central axis;

a drive unit which includes a motor having an output coupled operatively to said frame for rotating said frame, and thus said columns, about said central axis so that a selected one of said columns and individual ones of said data storage cassettes stored therein may be moved into said access position; and a master control unit electrically interconnected with said drive unit, said master control unit issuing a command signal to said drive unit for effecting preselected angular movement of said columns about said central axis to thereby controllably move said selected one of said plurality of columns into said access position to thereby present said individual ones of said data storage cassettes in said selected one of said columns at said access position, whereby said individual ones of said data storage cassettes may be grasped and removed from said selected one of said columns.

12. A storage unit as in claim 11, wherein said frame includes a central shaft which defines said central axis about which said plurality of columns are rotatable.

13. A storage unit as in claim 11, wherein said motor of said drive unit is a reversible motor.

14. A storage unit as in claim 11, wherein said master control unit includes a position sensing system for sensing relative positions of said columns when said storage unit is rotated.

15. A storage unit as in claim 14, wherein said position sensing system generates a position signal indicative of location of said selected one of said columns relative to said access position, said master control unit receiving said generated position signal and, in response thereto, determining the angular location of said selected one of said columns.

* * * * *